(12) United States Patent
Maddocks et al.

(10) Patent No.: US 9,792,607 B2
(45) Date of Patent: Oct. 17, 2017

(54) SYSTEM AND METHOD FOR MOBILE PIN SYNCHRONIZATION

(71) Applicant: MasterCard International Incorporated, Purchase, NY (US)

(72) Inventors: Ian Maddocks, Milton Keynes (GB); Simon Phillips, York (GB); David A. Roberts, Warrington (GB); Mehdi Collinge, Braine-l'Alleud (BE); Sandra Jansen, London (GB); Patrick Mestré, Namur (BE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 698 days.

(21) Appl. No.: 14/277,261

(22) Filed: May 14, 2014

(65) Prior Publication Data

US 2014/0344166 A1 Nov. 20, 2014

(30) Foreign Application Priority Data

May 14, 2013 (GB) .................................... 1308674.9

(51) Int. Cl.
| | |
|---|---|
| *G06Q 20/40* | (2012.01) |
| *H04L 9/00* | (2006.01) |
| *G06Q 20/32* | (2012.01) |
| *H04W 12/04* | (2009.01) |
| *H04W 12/06* | (2009.01) |

(52) U.S. Cl.
CPC ....... *G06Q 20/4012* (2013.01); *G06Q 20/322* (2013.01); *H04W 12/04* (2013.01); *H04W 12/06* (2013.01)

(58) Field of Classification Search
CPC . G06Q 20/4012; G06Q 20/322; H04W 12/06; H04W 12/04
See application file for complete search history.

(56) References Cited

U.S. PATENT DOCUMENTS

| | | | | |
|---|---|---|---|---|
| 6,999,569 B2* | 2/2006 | Risafi | ..................... | G06Q 20/04 235/379 |
| 7,885,870 B2* | 2/2011 | Nam | ..................... | G06Q 20/04 705/35 |
| 9,202,214 B2* | 12/2015 | Pochic | ................ | G06Q 20/341 |

(Continued)

FOREIGN PATENT DOCUMENTS

WO   WO 0193622 A1 * 12/2001 ............. H04W 8/22

*Primary Examiner* — Hosuk Song
*Assistant Examiner* — J. Brant Murphy
(74) *Attorney, Agent, or Firm* — Buckley, Maschoff & Talwalkar LLC (57) ABSTRACT

The present invention relates to a method and system for synchronizing a personal identification number (PIN) value stored in a mobile computing device, with a PIN value stored on a remote server. The remote server receives a request from the mobile computing device to record a PIN value, the request comprising the PIN value. The PIN value is recovered from the received request and stored at the remote server. An instruction set arranged to record the PIN value in a secure hardware element comprised within the mobile computing device is generated and transmitted to the mobile computing device. The instruction set executes on the mobile computing device in order to record the PIN value on the secure hardware element.

35 Claims, 4 Drawing Sheets

(56) References Cited

U.S. PATENT DOCUMENTS

| | | | | |
|---|---|---|---|---|
| 2002/0021804 | A1* | 2/2002 | Ledzius | H04L 9/0662 380/44 |
| 2003/0014672 | A1* | 1/2003 | Desikamani | G07F 7/1016 726/14 |
| 2004/0267665 | A1* | 12/2004 | Nam | G06Q 20/04 705/41 |
| 2006/0075263 | A1* | 4/2006 | Taylor | G06F 21/6245 713/194 |
| 2006/0223530 | A1* | 10/2006 | Bumiller | H04L 12/5895 455/435.1 |
| 2010/0308109 | A1* | 12/2010 | Maddocks | G06Q 20/341 235/382.5 |
| 2010/0308110 | A1* | 12/2010 | Maddocks | G06Q 20/341 235/382.5 |
| 2010/0312709 | A1* | 12/2010 | Maddocks | G06Q 20/4012 705/72 |
| 2011/0140841 | A1* | 6/2011 | Bona | G06K 19/06187 340/5.83 |
| 2012/0021722 | A1* | 1/2012 | Phillips | G06Q 20/3226 455/411 |
| 2012/0284526 | A1* | 11/2012 | Arnold | G06F 21/31 713/182 |
| 2013/0305392 | A1* | 11/2013 | Bar-El | H04L 9/08 726/29 |
| 2015/0178515 | A1* | 6/2015 | Cooley | G06F 21/6218 713/155 |

* cited by examiner

SYSTEM AND METHOD FOR MOBILE PIN SYNCHRONIZATION

CROSS-REFERENCE TO RELATED APPLICATION

This application is a U.S. National Stage filing under 35 U.S.C. §119, based on and claiming benefit of and priority to GB Patent Application No. 1308674.9 filed May 14, 2013.

FIELD OF THE INVENTION

The present invention relates to a system and method for mobile PIN (personal identification number) synchronisation. In particular, the present invention relates to a system and method for synchronising a PIN held between a mobile computing device and a remote server.

BACKGROUND OF THE INVENTION

There is a genuine desire within the mobile computing industry to enable mobile devices, for example mobile telephones and tablet computing devices, to be used as payment devices in order to participate in a financial transaction. This would enable the mobile device to provide a genuine substitute for the traditional debit and/or credit card. This desire has gained considerable traction in recent years with the rollout of near-field communication (NFC) enabled mobile computing devices.

NFC technology enables NFC-enabled mobile computing devices, for example NFC enabled smartphones, to establish radio communication with other NFC-enabled devices by touching them together or bringing them into close proximity (usually separated by no more than a few centimeters). One of the commercially promising applications of this technology is in the field of contactless payment transactions. In such applications, a mobile computing device such as a smartphone provided with an NFC and payment functionality is arranged to communicate with a contactless point of sale (POS) terminal to process a user-presented financial transaction.

The EMV® protocol, published by EMVCo LLC provides a communication standard based on ISO/IEC 7816 for contact cards, such as traditional PIN and Chip cards; and standards based on ISO/IEC 14443 for contactless transactions as supported by NFC devices. MasterCard's PayPass® is one example of a currently used contactless transaction system based on the EMV® protocol enabling NFC-enabled mobile devices to participate in financial transactions. Visa's payWave® and American Express' ExpressPay® are two other examples of current contactless transaction systems implementing the EMV® protocol.

For contactless payment user PIN entry is typically required to authorise a transaction where the value of the transaction exceeds a predetermined threshold value. PIN entry may be effected directly on the mobile device, or in the PIN entry pad operatively connected to the POS terminal. The EMV protocol supports two different types of PIN verification: On-line verification and Off-line verification. In On-line verification the user-entered PIN is remotely verified by the payment credential issuer to ensure that the correct PIN has been entered. This comprises establishing a remote connection between the PIN-entry operatively connected to the POS terminal and the remote issuer. The remoter issuer verifies that the entered PIN is correct, following which a confirmation message is relayed back to the POS terminal confirming approval of the requested transaction.

In Off-line PIN verification the user-entered PIN is locally verified by the mobile device. This requires maintaining a locally stored PIN on the mobile payment device, which is commonly referred to as the mobile PIN (mPIN) or code and is different to the PIN associated with the user's traditional debit/credit card. For example, the mPIN may be stored locally in a secure hardware element comprised in the mobile device. Upon mPIN entry, the entered mPIN value is verified locally with the mPIN value stored on the secure hardware element. Subject to successful local verification, the subsequent transaction is authenticated, and the transaction details relayed from the mobile payment device to the POS terminal and on to the issuer for either real-time processing or batch processing.

Due to the complexities of maintaining one PIN value in two different locations, mobile banking implementations either use Off-line PIN verification or On-line PIN verification. There is currently no adequate solution in the mobile banking field, and specifically in contactless payment systems, to this problem of maintaining and synchronising one PIN value in two different remote locations.

Traditional debit and/or credit card transaction systems provide Pin Change functionality at designated automated teller machines (ATMs), such as at the issuing bank's ATMs. To change PIN value, a user is required to insert their debit and/or credit card in the ATM's designated card slot, and select the Pin Change function. Once the new PIN value has been selected by the user, it is first forwarded to the card issuer, where the appropriate user records are updated with the new PIN value, and subsequently written by the ATM to the integrated circuit card (ICC) where present, and/or to the magnetic stripe comprised on the inserted debit/credit card. This ensures that the PIN value known by the issuer and the PIN value stored locally on the debit/credit card are synchronised, such that both On-line and Off-line PIN verification transactions are supported. Confidentiality is maintained during the PIN synchronisation process by the secure communication channel present between the ICC and the issuer.

This known solution is inadequate for use in contactless transaction systems, including mobile banking where mobile devices are used to participate in transactions, since current ATMs are unable to write data to mobile computing devices in a secure and confidential manner. Even if such a solution were technically possible it is undesirable since such a geographically-limited solution undermines one of the principle advantages of mobile technology—namely, the ability to access and update one's data from any geographical location. Furthermore, the expense required to modify current ATMs to provide them with functionality to write to mobile computing devices is prohibitive.

A need therefore exists to provide a secure method for synchronising a PIN between a mobile computing device and an issuer, which method must be compatible with existing On-line and Off-line PIN verification functionality. It is an object of the present invention to provide a solution to this problem.

SUMMARY OF THE INVENTION

According to a first aspect of the present invention there is provided a method of synchronising a personal identification number (PIN) value stored in a mobile computing device, with a PIN value stored on a remote server comprising: receiving at the remote server from the mobile computing device a request to record a PIN value, the request comprising the PIN value;
recovering the PIN value from the received request and storing the PIN value at the remote server; generating; and transmitting an instruction set arranged to record the PIN value in a secure hardware element comprised within the mobile computing device, when the instruction set is executed on the mobile computing device; and executing the instruction set on the mobile computing device in order to record the PIN value on the secure hardware element.

The secure hardware element provides a trusted and/or tamper protected execution environment and is configured as a write-protected digital black box, in order to maintain the confidentiality of the data stored and processed therein. For example, to maintain the confidentiality of the cryptographic keys used by the selected financial transaction protocol, and to maintain the confidentiality of the stored PIN value. Certain WRITE privileges associated with the secure hardware element are restricted to authenticated devices. WRITE privileges indicate whether a device has been authorised to write and/or otherwise amend data stored on the secure hardware element. An instruction script written by an authenticated device is executable by the secure hardware element. In the present method the remote server is an authenticated device. Since the instruction set for recording the PIN value on the mobile device's secure hardware element is generated by the remote server, confidentiality of the PIN value is maintained, even in insecure environments where, for example, the security of the mobile computing device has been compromised. A fraudulent mobile computing device is unable to obtain the PIN value since it is unable to access data stored in the secure hardware element, nor is it able to write data to the secure hardware element. The confidentiality of the PIN is thus maintained. In this way, a PIN value stored on a user's mobile computing device may be securely synchronised with the PIN value stored at a remote server, such as the issuer server.

The PIN value relates to any alphanumeric code and/or string of one or more alphanumeric digits. The PIN value may also relate to any gesture based code, associated with a specific user gesture, which is used to identify the user. Accordingly, all references to PIN value herein are to be construed as comprising any one of: an alphanumeric code and/or a string of one or more alphanumeric digits; and a gesture based code.

The present method is compatible with both On-line and Off-line PIN verification transaction systems, because it enables a single PIN value to be securely synchronised between two remotely located devices.

At least one embodiment of the present method comprise forwarding a confirmation message to the remote server to confirm that the PIN value was correctly recorded on the secure hardware element. The confirmation message confirms to the remote server that the PIN value has been recorded on the secure hardware element of the mobile computing device. If the confirmation message indicates that the PIN value has not been correctly recorded on the secure hardware element, then the method comprises reverting to a previous PIN value shared with the mobile computing device at the remote server. This ensures that the PIN values stored at respectively the secure hardware element and the remote server are always synchronised, and mitigates for scenarios where a generated instruction set is not correctly executed by the mobile computing device, which may result in disunity between the stored PIN values.

When the confirmation message is indicative of the PIN value having been successfully recorded on the secure hardware element, then the method comprises replacing the previous PIN value stored at the remote server with the new value.

Preferably, the mobile computing device and the remote server share a first symmetrical encryption key, the first encryption key being stored on the secure hardware element and at the remote server, and the method comprises: generating at the secure hardware element, a second encryption key using the first encryption key and encrypting the request with the second encryption key, wherein the recovering step comprises generating the second encryption key at the remote server using the shared first symmetrical encryption key;
and using the generated second encryption key to recover the PIN value from the received request.

This improves the confidentiality of data transmissions between the mobile computing device and the remote server.

In at least one embodiment the second encryption key is generated at the secure hardware element using the first symmetrical encryption key and a unique number generated by the mobile computing device. This ensures that the generated second encryption key is unique to the request. The method further comprises: forwarding the unique number to the remote server with the request; and generating the second encryption key at the remote server using the shared first symmetrical encryption key and the unique number. This ensures the uniqueness of the second encryption key.

In at least one embodiment the unique number comprises an application transaction counter (ATC) value, whose value is unique for each data exchange with the remote server; and/or an unpredictable number generated by the mobile computing device and/or by the remote server and provided to the mobile computing device. Within the present context an unpredictable number refers to a randomly generated number, whose probability of occurrence is equivalent to all other possibilities, which results in maximum uncertainty (or equivalently maximum entropy). This improves the robustness of the generated second encryption key.

In at least one embodiment the mobile computing device may relate to any one of: a mobile telephone; a smartphone; a tablet computer; or a consumer electronics device.

In at least one embodiment the secure hardware element is a Trusted Platform Module (TPM).

In at least one embodiment the secure hardware element is a Trusted Execution Environment (TEE).

In at least one embodiment, the secure hardware element is a Subscriber Identity Module (SIM); or a secure digital memory card.

Alternatively, the secure hardware element is an integrated circuit chip comprised within the mobile computing device.

According to a second aspect of the present invention there is provided a server for synchronising a personal identification number (PIN) stored in a mobile computing device with a PIN value stored in a storage device operatively connected to the server, the server comprising: a receiver arranged to receive a request from the mobile device to record a PIN value, the request comprising the PIN value; PIN recovery apparatus for recovering the PIN value from the received request; PIN storage apparatus arranged to store the PIN value in the storage device; a processor for generating an instruction set executable by the mobile computing device, the instruction set comprising instructions for recording the PIN value in the mobile computing device; and a transmitter for transmitting the instruction set from the server to the mobile computing device.

The PIN recovery apparatus may comprise a first symmetrical encryption key shared with the mobile computing device, and the PIN recovery apparatus may be arranged to generate a second encryption key to recover the PIN value from the received request.

Preferably, the server comprises an unpredictable number generator arranged to generate an unpredictable number for use by the PIN recovery apparatus to generate the second encryption key.

The processor is preferably arranged to generate an instruction set executable by a secure hardware element comprised in the mobile computing device.

In at least one embodiment the mobile computing device is a mobile telephone, and the server is operatively communicable with the mobile telephone in use.

Alternatively, the mobile computing device is a tablet computer, and the server is operatively communicable with the tablet computer in use; or the mobile computing device is a consumer electronics device, and the server is operatively communicable with the consumer electronics device in use.

According to a third aspect of the present invention there is provided a method of synchronising a personal identification number (PIN) at a server with a PIN value stored in a mobile computing device, comprising the steps of:
receiving at the server a request to record the PIN value from the mobile computing device, the request comprising the PIN value;
recovering the PIN value from the received request;
generating and transmitting an instruction set to the mobile computing device, the instruction set being arranged to record the PIN value on the mobile computing device, when the instruction set is executed on the mobile computing device; and
recording the PIN value in a storage device operatively coupled to the server upon receipt of a confirmation message from the mobile computing device, the confirmation message confirming that the PIN value was successfully written to the mobile computing device.

Preferably, the generated and transmitted instruction set comprises instructions for recording the PIN value on a secure hardware element comprised in the mobile computing device.

The recording step may comprise updating a database record comprised in the storage device with the PIN value, the record being associated with a user of the mobile computing device, and/or with the mobile computing device. Alternatively, the record may be associated with a payment account holder.

According to a fourth aspect of the present invention there is provided a mobile computing device arranged to synchronise a personal identification number (PIN) value with a PIN value stored on a remote server. The mobile computing device comprises: a transmitter arranged to transmit a request to record a PIN value to the remote server, the request comprising the PIN value; a receiver arranged to receive an instruction set from the remote server, the instruction set comprising instructions for recording the PIN value; means, in the form of a secure processor, for executing the received instruction set in order to record the PIN value on the mobile computing device; and a processor arranged to generate a confirmation message for transmittal to the remote server, the message confirming if the PIN value was correctly recorded on the mobile computing device.

The secure processor for executing the received instruction set may comprise: a secure hardware element arranged to execute the received instruction set, and to record the PIN value within a storage module local to the secure hardware element.

In at least one embodiment the secure hardware element is provided with a first symmetrical encryption key shared with the remote server; and the secure hardware element is arranged to generate a second symmetrical encryption key using the first key, the second symmetrical encryption key being for use in encrypting the request.

Preferably, the secure hardware element is arranged to encrypt the request with the second symmetrical encryption key.

In at least one embodiment the secure hardware element comprises a unique number generator arranged to generate a unique number for each generated request, and the secure hardware element is arranged to generate the second symmetrical encryption key using the first symmetrical encryption key and the unique number, such that the second symmetrical key is unique for each request.

The unique number may relate to an application transaction counter (ATC) value, and/or an unpredictable number.

Preferably, the secure hardware element is configured to provide a secure processing environment independent to a processing environment of the mobile computing device, such that confidential data processed by the secure hardware element is processed separately from the normal processing environment of the mobile computing device. This prevents the mobile computing device being able to access confidential data processed by the secure hardware element, such as PIN values, thus maintaining the confidentiality of the data. This is advantageous in environments where it is not possible to determine the trustworthiness of the mobile computing device.

The secure hardware element may relate to any one of: a Trusted Platform Module (TPM), a Trusted Execution Environment (TEE), a Subscriber Identity Module (SIM), a secure digital memory card; or an integrated circuit chip comprised within the mobile computing device.

According to a fifth aspect of the invention there is provided a method of synchronising a personal identification number (PIN) at a mobile computing device with a PIN value stored in a remote server comprising the steps of:
transmitting a request to record a new PIN value for the mobile computing device to the remote server, the request comprising the PIN value;
receiving an instruction set from the remote server in reply to the request, the instruction set comprising instructions for recording the PIN value on the mobile computing device;
executing the instruction set on the mobile computing device; and
generating and transmitting a confirmation message to the remote server, the message confirming if the PIN value was correctly recorded on the mobile computing device.

Preferably, the received instruction set comprises instructions for recording the PIN value on a secure hardware element comprised in the mobile computing device; and the method comprises executing the instruction set on the secure hardware element in order to record the PIN value on a storage module local to the secure hardware element.

In at least one embodiment the secure hardware element is provided with a first symmetrical encryption key shared with the remote server, and the method comprises: generating a second symmetrical encryption key using the first key at the secure hardware element; and encrypting the request at the secure hardware element with the second symmetrical encryption key prior to transmitting the request to the remote server.

In at least one embodiment the method comprises: generating a unique number for each request at the secure hardware element; and the second symmetrical encryption key is generated using the first symmetrical encryption key and the unique number, such that the second symmetrical encryption key is unique for each request.

In at least one embodiment the unique number is an application transaction counter (ATC) value, and/or an unpredictable number.

Preferably, the secure hardware element is configured to provide a secure processing environment independent to a processing environment of the mobile computing device; and the instruction set is executed within the secure processing environment of the secure hardware element.

DESCRIPTION OF THE FIGURES

Embodiments of the present invention will be described, by way of example only, with reference to the below summarised enclosed figures, of which.

DESCRIPTION OF THE INVENTION

Specific embodiments of the present invention will now be described with reference to the enclosed figures. Whilst the preferred embodiments are described below with reference to a mobile device, and specifically with reference to a mobile telephone, for example, a smartphone, it is to be understood that this is non-limiting and is for illustrative purposes only. The present system and method may be implemented on any electronic mobile computing device, including but not limited to: a portable computer; any electronic portable handheld computing device, such as a notepad, iPad®, iPhone®, or similar tablet computer, and/or any smartphone, including devices configured with the Android® operating system.

Figure 1:
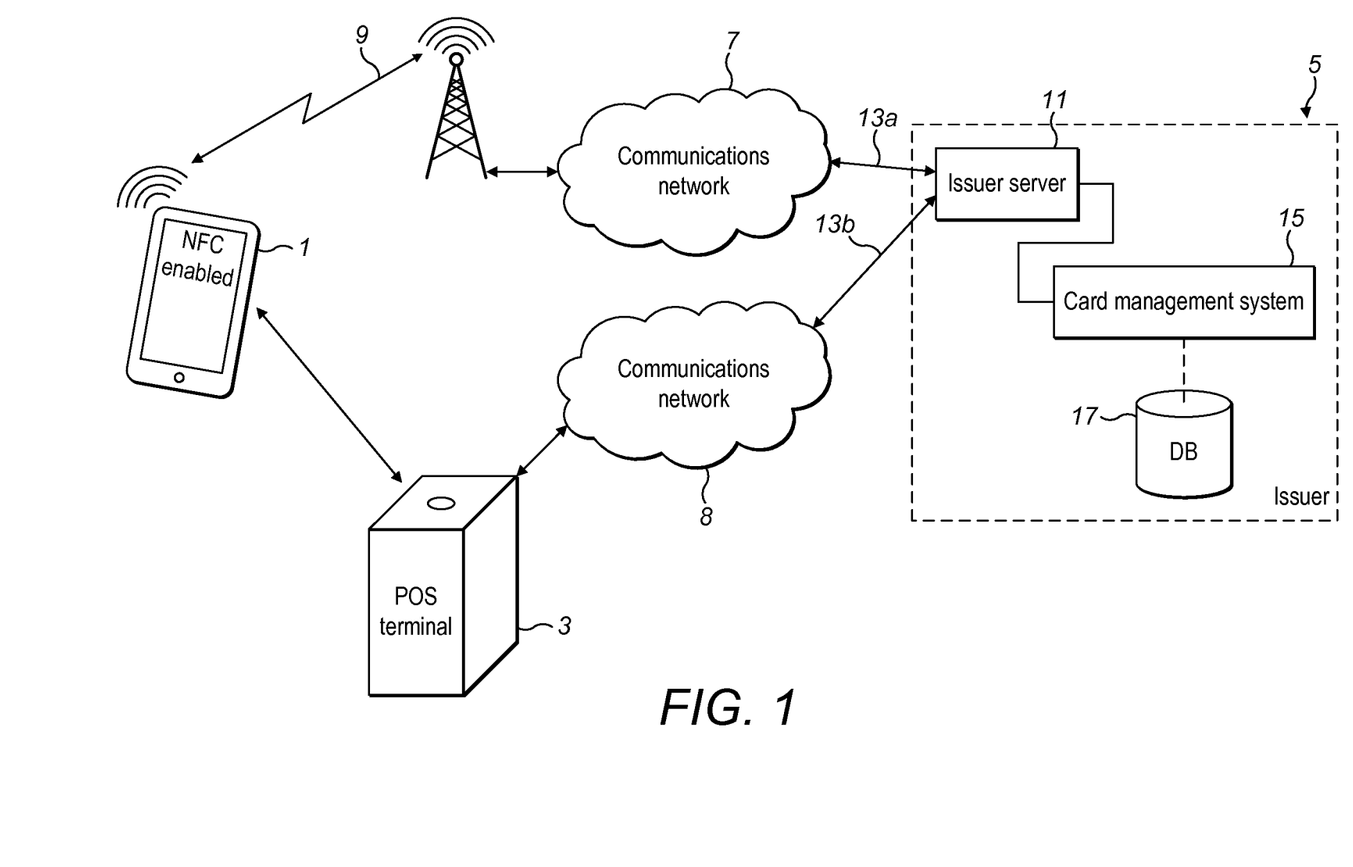
FIG. 1 is a schematic overview of a mobile contactless transaction system within which an embodiment of the present invention is implemented.

FIG. 1 is a schematic system overview of a mobile contactless payment transaction system within which the present method of synching a PIN value may be implemented, and is included by way of a background in order to facilitate the skilled reader's understanding of the present invention.

In accordance with the present example, a mobile payment-enabled smartphone 1 provided with NFC functionality is configured to interact with an electronic POS terminal 3 in order to facilitate a financial transaction. The transaction is initiated by bringing the smartphone 1 within the required proximity of the POS terminal 3. To authenticate the transaction PIN entry may be required. This may be entered on an application stored locally on the smartphone 1, or on the POS terminal, as described previously in the background of invention section.

To support Off-line PIN verification, the PIN is entered via an application stored locally on the smartphone 1 and verified by a secure hardware element comprised within the smartphone 1. Conformation of a successful PIN verification, along with the transaction details is forwarded to the issuer 5 for transaction authorisation. To this end, the smartphone 1 is communicably connected to the issuer 5 via a first communication network 7, which network may relate to the internet or any other similar wide area network (WAN).

Similarly for On-line PIN verification, the POS terminal 3 is communicably connected to the issuer 5 via a second communication network 8 different to the first communication network 7. When the PIN value is entered on the POS terminal 3 it is encrypted along with transaction data and forwarded to the issuer 5 for verification.

The issuer 5 may comprise an issuer server 11, arranged to receive and transmit payment transaction data via communication channels 13a, 13b which communication channels provide a communication link with the first and second communication networks 7, 8. The issuer server 11 may be operatively connected to a card management system 15 arranged to manage all transactions related to debit/credit card accounts issued by the issuer 5. The card management system 15 may comprise a database 17, which stores all data relevant to each debit/credit card account and/or user account, including PIN numbers.

The specific details of how funds are transferred between the payee's account (the mobile user) and the recipient's account is dictated by the adopted payment protocol. For example, the EMV protocol is one example of a commonly adopted payment protocol, the specific details of which are outside the scope of the present invention. Instead, the interested reader is referred to the EMV specifications, which are publically available on the internet at the following address: http://www.emvco.com.

An overview of the PIN synchronisation functionality is now described with reference to the contactless transaction system of FIG. 1. PIN synchronisation is required when a PIN change function is initiated from the mobile banking-enabled smartphone 1, provided with NFC functionality. It is important to note that whilst the present embodiment is described within the context of a smartphone provided with NFC functionality, this is a non-limiting example provided for illustrative purposes only. The present invention is not limited for use within NFC environments.

The PIN change function may be selected from within the payment application and/or digital wallet running on the smartphone 1, which payment application and/or digital wallet is configured to manage all transactions associated with the user's financial account. Within the present context, a digital wallet refers to a software application executed on the user's mobile device and arranged to manage transactions associated with the user's financial account. In the ensuing description all references to a payment application are to be construed as comprising a digital wallet.

The smartphone 1 is connected to the first communication network 7 via its mobile telephone network 9. Alternatively, the smartphone 1 may be operatively connected to the communication network 7 via a local access network (LAN) when, for example, the user is operatively connected to a local wireless (WiFi) internet connection. For present purposes, only the former non-limiting option is illustrated in FIG. 1, although it is to be appreciated, smartphones may support various different communication standards providing access to a communications network such as the internet, and such alternatives are compatible with the present method.

User verification may be required to initiate the PIN change, in which case the user may be requested to enter the current PIN value into the smartphone 1. The validity of the entered PIN is determined locally on the smartphone by the payment application. Provided that verification is successful, the PIN change process is then continued.

In other embodiments, the user may need to authenticate themselves to the issuer via a customer services helpline. For example, the user may contact the customer services helpline to obtain a unique transaction code, which is input into the smartphone 1 as proof of identity. The PIN change process then continues as described below.

The user enters the new PIN value into the smartphone 1, where a PIN Change request is generated. The PIN Change request is a cryptogram comprising the new PIN value supported by any other transaction data required by the issuer 5 to authenticate the PIN Change request. Such additional required transaction data may be specific to the particular issuer's implemented payment protocol. However, it is envisaged that such additional transaction data may comprise any one or more of: a unique smartphone handset identifier that uniquely identifies the handset to the issuer 5; a user identifier, which uniquely identifies the user to the issuer 5; and/or a user PAN which uniquely identifies the user's payment account number to the issuer 5. The PIN Change request is subsequently forwarded to the issuer server 11, where it is subsequently forwarded to the card management system 15. The received PIN Change request is decrypted in order to recover the new PIN value using the other provided relevant transaction data. The relevant record comprised within the database 17 is then updated with the new PIN value.

The card management system 15 generates an encrypted PIN Change script, which is forwarded back to the smartphone 1. Upon receipt of the encrypted PIN Change script it is decrypted by the smartphone 1 and used to write the new PIN value to a Secure Hardware Element comprised within the smartphone 1. In this way, the smartphone 1 is updated with the new PIN value synchronised with the PIN value stored at the issuer 5.

To ensure that PIN data is fully synchronised between the issuer 5, and the smartphone 1, the card management system 15 may require receipt of a WRITE confirmation message from the smartphone 1. This WRITE confirmation message provides confirmation to the card management system 15 that the smartphone 1 has successfully written the new PIN value to the secure hardware element, and thus confirms to the card management system 15 that the new PIN value has been successfully synchronised between the issuer 5 and the smartphone 1.

A valid data connection is required by the smartphone 1 in order to send the Pin Change request to the issuer 5, and in order to receive the associated PIN Change script response. In the event that the smartphone 1 suffers a temporary loss of data connection whilst the PIN change process is being executed, then the PIN Change script may be stored in a storage buffer local to the issuer 5 until such time as the smartphone 1 recovers its data connection, and the PIN change process may be completed. The PIN change process is aborted when the data connection loss exceeds a predetermined temporal threshold value.

Preferably, until the WRITE confirmation message has been received by the card management system 15, the new PIN value is not committed as the active PIN value at the issuer 5. Instead, the prior PIN value continues to be the active PIN. The user is preferably informed that the PIN change transaction was successful once the smartphone 1 has returned the WRITE message, after which the new PIN value is indicated as an active PIN and may be used to perform financial transactions.

Figure 2:
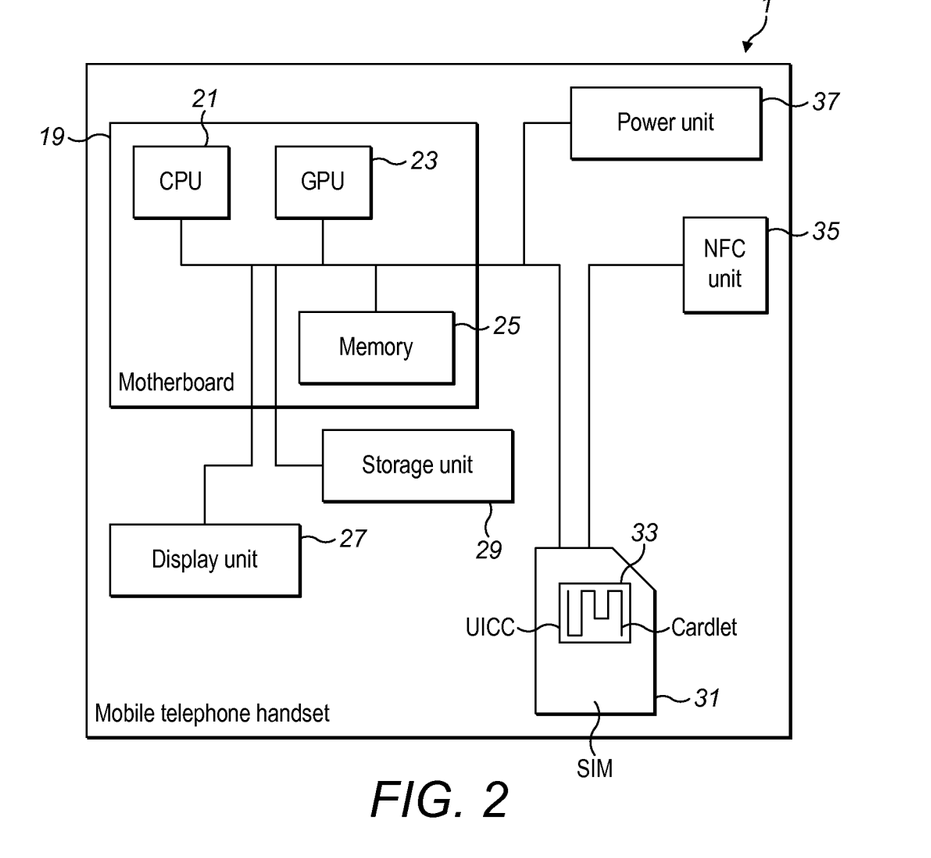
FIG. 2 is a functional diagram of the components of a smartphone for use in synchronising a PIN value with a remote server within the contactless transaction system of FIG. 1.

FIG. 2 is a schematic diagram illustrating the functional components of the smartphone 1, used in the contactless transaction system of FIG. 1. The smartphone 1 comprises a motherboard 19, which motherboard comprises the central processing unit (CPU) 21; a graphical processing unit (GPU) 23; a volatile memory unit 25, such as a random memory access module or similar. The smartphone also comprises a display unit 27, which is controlled by the GPU 23. The display unit 27 may comprise a touch-screen for user entry of alphanumeric symbols, or alternatively the smartphone may comprise a keyboard (not shown). A non-volatile storage unit 29 is provided for storing data. As mentioned previously a secure hardware element 31 is provided, which may comprise an Integrated Circuit Card (ICC) 33, such as a Universal Integrated Circuit Card (UICC), on which the current active PIN value is stored.

In the illustrated example, the secure hardware element 31 is provided by the Subscriber Identity Module (SIM). It is to be appreciated that the SIM is an ICC 33, which stores the IMSI and associated key used to identify and authenticate subscribers on mobile telephony devices. The SIM may comprise encryption/decryption keys in order to encrypt/decrypt all data transmissions with the issuer 5. The smartphone 1 also comprises an NFC unit 35, which provides near-field data communication functionality. The NFC unit 35 is operatively connected to the secure hardware element 31. Optionally, the NFC unit 35 may also be operatively coupled to the CPU 21, enabling NFC communications to be controlled by both the CPU 21 and the secure hardware element 31. The functional components of the smartphone 1 are powered by the smartphone's power unit 37, including the NFC unit 35.

In preferred embodiments, the transaction application is stored locally to the smartphone 1 and comprises two components: a cardlet component and a midlet component. The cardlet component is stored on the secure hardware element 31, and comprises the stored PIN value. The cardlet is run from the secure hardware element 31 and is not processed by the smartphone's CPU 21. Alternatively, the cardlet may be implemented on other secure hardware element forms, such as a trusted execution environment (TEE).

The midlet component is stored locally on the smartphone's storage unit 29, and is run on the smartphone's CPU 21. The midlet and cardlet components are run within independent processing environments, and in parallel during operation of the transaction application. The cardlet may comprise a Master Key Application Cryptogram (MKac), which is a secure cryptographic key shared with the issuer 5, and enables the cardlet to generate validly signed cryptograms for transmission to the issuer 5. The secure hardware element 31 is preferably a black box, to ensure confidentiality of the MKac. In other words, the inner components and logic of the secure hardware element 31 are opaque. In this way it is infeasible for a fraudulent user to obtain the MKac by analysis of the internal logic of the secure hardware element 31. Confidentiality of the MKac is thus ensured.

The graphical interface components of the transaction application are comprised within the midlet, including all other functions of the transaction application not directly related to the generating of cryptograms and PIN validation.

Details of how the cardlet and midlet application components interact to provide PIN synchronisation are now described with reference to the sequence diagram of FIGS. 3a and 3b.

Figure 3A:
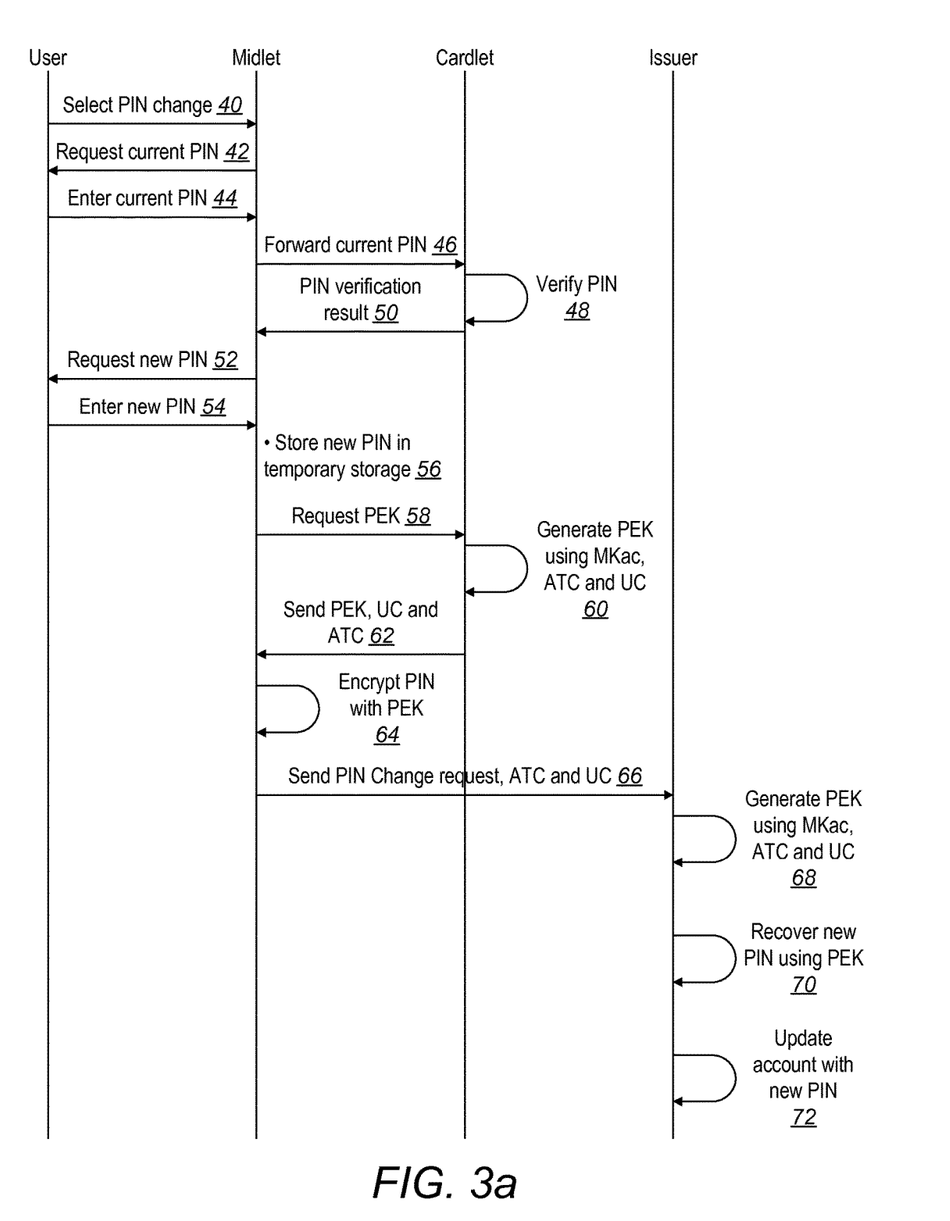
FIGS. 3a and 3b are a sequence diagram outlining the method steps required to synchronize a PIN value between the smartphone of FIG. 2 and remote issuer server of FIG. 1.
Figure 3B:
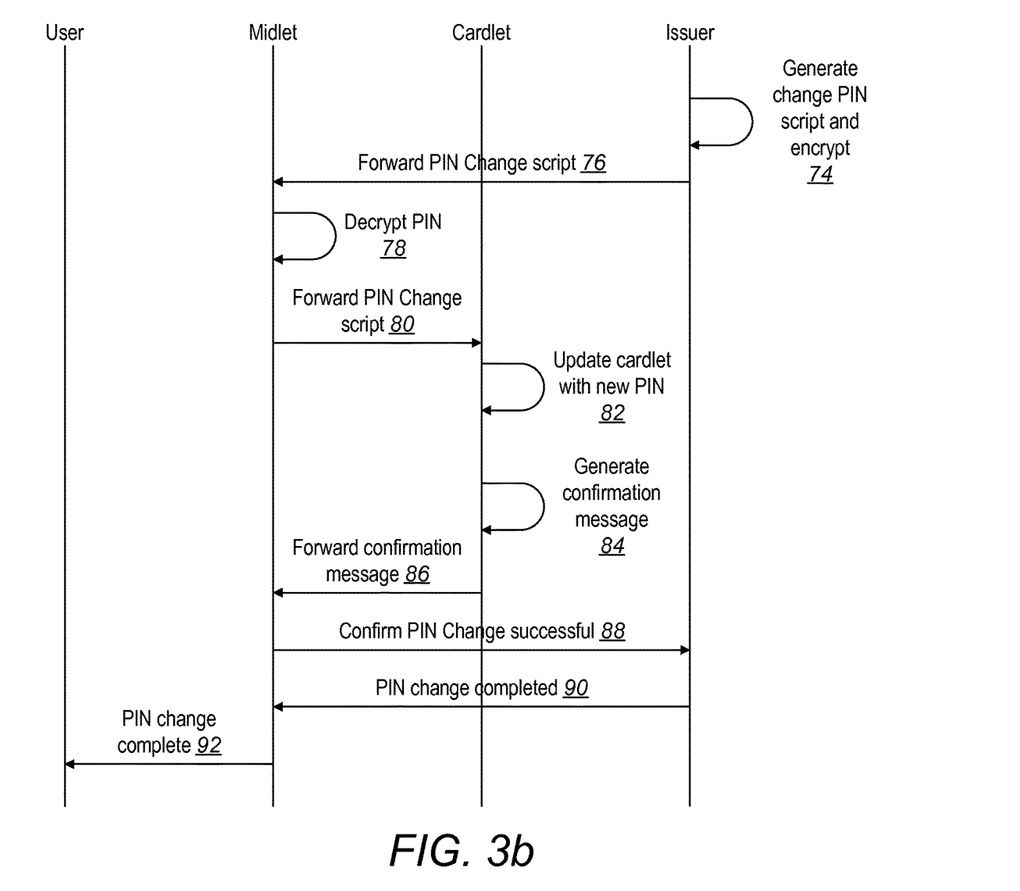

FIGS. 3a and 3b illustrate the different steps comprised in synchronising a PIN value between the smartphone 1 of FIG. 2 and the issuer 5 of FIG. 1, in accordance with an embodiment. The illustrated sequence diagram highlights the data exchanges between the user, midlet, cardlet and issuer 5. The PIN change function is selected by the user at step 40, which initiates the PIN synchronisation process. This is achieved through the GUI of the midlet component of the transaction application stored locally to the smartphone 1.

For security reasons, user validation may be required before proceeding further with the PIN change request. This may be achieved by requiring user PIN entry. At step 42 the midlet requests user entry of the current PIN value. In response, the user enters the current PIN value at step 44 using the available PIN entry device native to the smartphone 1—for example, the smartphone's touchscreen where provided, or keyboard.

The entered PIN value is forwarded from the midlet to the cardlet, at step 46. Upon receipt, the cardlet verifies the validity of the received PIN value, at step 48, and returns the verification result to the midlet, at step 50. If a verification failed result is returned, a PIN error message may be displayed in the application GUI to the user. The cardlet may also maintain a temporary record noting the number of times that the PIN has been entered incorrectly, and may be configured to prevent any further transactions requiring its input should the PIN be entered incorrectly more than an allowable threshold limit. Conventionally, this threshold limit is set to three sequentially entered incorrect PINs. In other words, if the PIN is entered incorrectly three times, the cardlet is arranged to prevent any further transactions until unlocked via an issuer script or PIN Unlock Key (PUK) is supplied to the cardlet—its operation is effectively bricked until it is unlocked. This is a security feature to prevent fraudulent users deriving the current PIN value using a brute force attack, and also maintains the confidentiality of the PIN on the secure hardware element 31. In the event that a PIN verification failed result is returned, the user may be prompted via the GUI to re-enter the PIN or to enter a User Authentication Code provided via communication with the issuer, for example via the issuer's customer services helpline. Alternatively, the user may terminate the PIN change request.

Once either a successful PIN verification result is returned at step 50, or a User Authentication Code entered, the midlet requests that the user enter the new PIN value using the PIN entry device available to the smartphone 1, at step 52. The user provides the smartphone 1 with the desired new PIN value at step 54. In certain embodiments, the user may be required to enter the new PIN value in duplicate to reduce the risk of the user accidentally entering the desired new PIN value incorrectly.

Once the smartphone 1 has been provided with the new PIN value, the midlet stores the new PIN value in temporary storage, for example in the memory unit 25, at step 56 and requests a PIN Encryption Key (PEK) from the cardlet, at step 58. The PEK relates to a unique symmetrical encryption key which is generated using a Master Key stored on the cardlet and shared with the issuer 5. Preferably, the PEK is generated using the Master Key Application Cryptogram (MKac), an Application Transaction Counter (ATC) value and an Unpredictable Number (UN), at step 60. The ATC is a number whose value increases incrementally with each transaction that the cardlet participates in. Thus, its value is unique for each different transaction, and its inclusion in generating the PEK ensures that each generated PEK is also unique. The UN is generated by the midlet, and ensures the uniqueness of the generated PEK, and prevents replay and/or brute force attacks.

Alternatively, the UN may be generated by the cardlet or the issuer 5. In the latter example, the midlet forwards a request to the issuer 5 for a UN in support of the forthcoming PIN Change request. This allows the issuer 5 to ensure the freshness of the follow up PIN Change request. For example, the issuer may apply a time threshold, such that any PIN Change request received after expiry of the time threshold limit is ignored. This protects against relay attacks, which introduce an additional time latency in the time taken to receive the PIN Change request at the issuer 5 from the smartphone 1.

Returning to the discussion of FIGS. 3a and 3b, the PEK, ATC and UN value are forwarded from the cardlet to the midlet at step 62. The new PIN value held in temporary storage is encrypted with the received PEK by the midlet at step 64, in order to generate the PIN Change request.

Alternatively, the PIN Change request may be generated in the cardlet at step 60, in which case step 58 comprises the new user entered PIN value. This is a more robust solution since it does not require transferring the PEK between hardware and software components, thereby maintaining the confidentiality of the PEK. In accordance with this alternative, at step 62 the PIN Change request, ATC and UC are transferred to the midlet and step 64 is skipped.

The PIN Change request, comprising the enciphered new PIN, the ATC, and UN values are forwarded at step 66 from the midlet to the issuer 5, and specifically to the issuer server 11. Since the issuer 5 and the cardlet are both provided with the MKac, the issuer 5 can generate the correct PEK if provided with the correct ATC and UN values, and for this purpose the ATC and UC values are forwarded to the issuer 5, at step 66.

Using the MKac and the received ATC and UC values, the issuer server 11 generates the correct PEK required to decipher the received cryptogram, at step 68. The new PIN value is recovered by deciphering the received enciphered PIN value using the generated PEK, at step 70. Once the new PIN value has been recovered, the relevant account record in the card management system's database 17 is updated with the new PIN value, at step 72.

At step 74, the issuer 5 generates the PIN Change script, comprising the encrypted PIN value, which instructs the cardlet to replace the stored PIN value with the new PIN value, when the PIN Change script is executed on the cardlet. When the present method is used within an EMV payment protocol, the PIN Change script is protected by the EMV scripting keys, but in other embodiments may be encrypted using the PEK, or any other cryptographic keys provided for scripting in accordance with the implemented transaction protocol. Alternatively, the PIN Change script may be encrypted using a new key generated using the shared MKac along with other data shared between the issuer and the cardlet. For example, such shared data may relate to the ATC or to a unique identifier associated with the cardlet, such that only the intended cardlet can accurately decrypt the received script. The generated script is transmitted back to the midlet, at step 76.

The received PIN Change script may be decrypted by the midlet at step 78 using the previously generated PEK, and/or the script is forwarded to the cardlet at step 80.

Alternatively, decryption of the received script at step 78 may occur at the cardlet, in which case step 80 is redundant.

The cardlet is updated with the new PIN value by executing the PIN Change script on the cardlet, at step 82. In the event of a successful PIN update, the new PIN value is written to the cardlet replacing the previous PIN value. A confirmation message is generated at step 84 by the cardlet to confirm if the PIN Change script was executed successfully. Only successful execution of the PIN Change script results in the PIN value being updated on the cardlet, otherwise the previous PIN value is maintained. The confirmation message is forwarded to the midlet at step 86, for subsequent transmission to the issuer 5, at step 88.

Upon receipt of the confirmation message, the issuer 5 checks to determine whether the PIN Change script was successfully executed on the cardlet and whether the new PIN value was successfully written to the cardlet. In the event that the confirmation message indicates that the script was not successfully executed, then the issuer 5 amends the relevant account record to revert to the previous PIN value, thus maintaining the PIN values stored on respectively the cardlet and at the issuer synchronised. Instead, if the confirmation message is indicative of a successfully executed PIN update script, then preferably the issuer 5 generates and forwards a confirmation message at step 90, to the midlet. This serves to confirm to the midlet that the issuer has updated the relevant records with the new PIN value. The midlet may then display a message to the user confirming the completion of the PIN change process, at step 92. The last two steps—steps 90 and 92—are optional, and the process could equally well be terminated after step 88 in alternative embodiments.

Whilst FIGS. 3a and 3b illustrate generically the different steps comprised in the present method, it should be clear to the skilled reader that further steps may be involved which will depend on the transaction environment in which the present method is implemented. For example, if the present method is implemented within an EMV compliant transaction system, then further steps may be required in order to generate a double or triple length PEK DES (Data Encryption Standard) key, since the EMV protocol specifies precise requirements for generating compliant cryptographic keys. However, such modifications do not substantially alter the present method and fall within its scope.

In alternative embodiments, the PEK may be generated using dynamic card verification code (dCVC) values shared with the issuer. Such dCVC values are used in contactless magnetic stripe card applications.

In alternative embodiments the secure hardware element may relate to a Trusted Platform Module (TPM) comprised within the mobile computing device and/or operatively coupled thereto.

Alternatively, the secure hardware element may relate to a secure digital memory card (SD card) operatively coupled to the mobile computing device. In such embodiments it is envisaged that the SD card is provided to the user by the issuer, and comprises the relevant cryptographic keys required to participate in transactions with the issuer. The SD card is arranged to be secure such that the mobile computing device cannot write to the SD card without being provided with the relevant PIN Change script by the issuer.

Alternatively, the secure hardware element could be an ICC (integrated circuit card) on the handset motherboard.

Whilst the herein described embodiments have been described with respect to a smartphone, it is to be appreciated that the method of the present invention may be used in combination with any mobile computing device. Furthermore, the herein described method is not restricted for use within NFC environments. Instead, it is to be appreciated that the herein described method may be used in any environment that requires synchronisation of a PIN value between remotely located devices.

As mentioned previously, the method of the present invention may be used to synchronise gesture based PINs. In such embodiments, the PIN value relates to a specific user gesture. The gesture is a code which is used to confirm the identity of the user. Such alternative embodiments differ from the previously described embodiments only insofar as the PIN value of the preceding embodiments is now replaced by a user gesture code. The method is otherwise unchanged with respect to preceding embodiments.

Whilst specific embodiments have been described herein for illustrative purposes, it is to be appreciated that they are non-limiting. Furthermore, alternative embodiments are envisaged comprising any suitable combination of the herein described embodiments, and such alternatives fall within the scope of the present invention.

The invention claimed is:

1. A method of synchronising a personal identification number (PIN) value stored in a mobile computing device, with a PIN value stored on a remote server, the method comprising:

receiving at the remote server from the mobile computing device a request to record a PIN value, the request comprising the PIN value;

recovering the PIN value from the received request and storing the PIN value at the remote server;

generating and transmitting an instruction set arranged to record the PIN value in a secure hardware element comprised within the mobile computing device, when the instruction set is executed on the mobile computing device wherein the mobile computing device and the remote server share a first symmetrical encryption key, the first encryption key being stored on the secure hardware element and at the remote server;

executing the instruction set on the mobile computing device in order to record the PIN value on the secure hardware element; and generating at the secure hardware element, a second encryption key using the first encryption key and encrypting the request with the second encryption key, wherein the recovering step comprises generating the second encryption key at the remote server using the shared first symmetrical encryption key and using the generated second encryption key to recover the PIN value from the received request.

2. The method of claim 1, comprising:

forwarding a confirmation message to the remote server to confirm that the PIN value was correctly recorded on the secure hardware element.

3. The method of claim 2, comprising:

reverting to a previous PIN value shared with the mobile computing device at the remote server, if the confirmation message is indicative of the PIN value not having been correctly recorded on the secure hardware element.

4. The method of claim 2, comprising:
replacing a previous PIN value stored at the remote server when the confirmation message is indicative of the PIN value having been successfully recorded on the secure hardware element.

5. The method of claim 1, wherein the second encryption key is generated at the secure hardware element using the first symmetrical encryption key and a unique number generated by the mobile computing device, such that the generated second encryption key is unique to the request, the method comprising:
forwarding the unique number to the remote server with the request; and
generating the second encryption key at the remote server using the shared first symmetrical encryption key and the unique number.

6. The method of claim 5, wherein the unique number comprises an application transaction counter (ATC) value, whose value is unique for each data exchange with the remote server.

7. The method of claim 5, wherein the unique number comprises an unpredictable number generated by the mobile computing device.

8. The method of claim 5, wherein the unique number comprises an unpredictable number generated by the remote server and provided to the mobile computing device.

9. The method of claim 1, wherein the mobile computing device is any of the following: a mobile telephone, a smartphone, a tablet computer.

10. The method of claim 9, wherein the secure hardware element is a Subscriber Identity Module (SIM).

11. The method of claim 1, wherein the secure hardware element is a Trusted Platform Module (TPM), or a Trusted Execution Environment (TEE).

12. The method of claim 1, wherein the secure hardware element is a secure digital memory card.

13. A server for synchronising a personal identification number (PIN) stored in a mobile computing device with a PIN value stored in a storage device operatively connected to the server, the server comprising:
a receiver arranged to receive a request from the mobile computing device to record a PIN value, the request comprising the PIN value;
PIN recovery apparatus for recovering the PIN value from the received request;
PIN storage apparatus arranged to store the PIN value in the storage device;
a processor for generating an instruction set executable by the mobile computing device, the instruction set comprising instructions for recording the PIN value in a secure hardware element comprised within the mobile computing device wherein the mobile computing device and the remote server share a first symmetrical encryption key, the first encryption key being stored on the secure hardware element and at the remote server; and
a transmitter for transmitting the instruction set from the server to the mobile computing device to be executed on the mobile computing device in order to record the PIN value on the secure hardware element and to generate, at the secure hardware element, a second encryption key using the first encryption key and for encrypting the request with the second encryption key, wherein recovering the PIN value comprises generating the second encryption key at the remote server using the shared first symmetrical encryption key and using the generated second encryption key to recover the PIN value from the received request.

14. The server of claim 13, wherein the system comprises:
an unpredictable number generator arranged to generate an unpredictable number for use by the PIN recovery apparatus to generate the second encryption key.

15. The server of claim 13, wherein the processor is arranged to generate an instruction set executable by a secure hardware element comprised in the mobile computing device.

16. The server of claim 13, wherein the server is operatively communicable with the and wherein the mobile computing device is any of the following: a mobile telephone, a tablet computer, a smartphone.

17. A mobile computing device arranged to synchronise a personal identification number (PIN) value with a PIN value stored on a remote server, the mobile computing device comprising:
a transmitter arranged to transmit a request to record a PIN value to the remote server, the request comprising the PIN value wherein the PIN value is recovered from a received request and stored at the remote server;
a receiver arranged to receive an instruction set from the remote server, the instruction set comprising instructions for recording the PIN value;
a secure hardware element arranged to (i) execute the received instruction set, (ii) record the PIN value within a storage module local to the secure hardware element wherein the mobile computing device and the remote server share a first symmetrical encryption key, the first encryption key being stored on the secure hardware element and (iii) generate a second encryption key using the first encryption key and encrypting the request with the second encryption key wherein the second encryption key is generated at the remote server using the shared first symmetrical encryption key and the generated second encryption key is used to recover the PIN value from the received request;
a secure processor for executing the received instruction set in order to record the PIN value on the mobile computing device; and
a processor arranged to generate a confirmation message for transmittal to the remote server, the message confirming if the PIN value was correctly recorded on the mobile computing device.

18. The mobile computing device of claim 17, wherein the secure hardware element comprises a unique number generator arranged to generate a unique number for each generated request, and the secure hardware element is arranged to generate the second symmetrical encryption key using the first symmetrical encryption key and the unique number, such that the second symmetrical key is unique for each request.

19. The mobile computing device of claim 18, wherein the unique number is an application transaction counter (ATC) value.

20. The mobile computing device of claim 18, wherein the unique number is an unpredictable number.

21. The mobile computing device of claim 17, wherein the secure hardware element is configured to provide a secure processing environment independent to a processing environment of the mobile computing device.

22. The mobile computing device of claim 17, wherein mobile computing device is any one of the following: a mobile telephone, a smartphone, a tablet computer.

23. The mobile computing device of claim 22, wherein the secure hardware element is a Subscriber Identity Module (SIM).

24. The mobile computing device of claim 17, wherein the secure hardware element is a Trusted Execution Environment (TEE) or a Trusted Platform Module (TPM).

25. The mobile computing device of claim 17, wherein the secure hardware element is a secure digital memory card.

26. A method of synchronising a personal identification number (PIN) at a server with a PIN value stored in a mobile computing device, the method comprising the steps of:
receiving at the server a request to record the PIN value from the mobile computing device, the request comprising the PIN value;
recovering the PIN value from the received request and storing the PIN value at the remote server;
generating and transmitting an instruction set to the mobile computing device, the instruction set being arranged to record the PIN value on in a secure hardware element comprised within the mobile computing device, when the instruction set is executed on the mobile computing device wherein the mobile computing device and a remote server share a first symmetrical encryption key, the first encryption key being stored on the secure hardware element and at the remote server;
generating at the secure hardware element, a second encryption key using the first encryption key and encrypting the request with the second encryption key, wherein the recovering step comprises generating the second encryption key at the remote server using the shared first symmetrical encryption key and using the generated second encryption key to recover the PIN value from the received request; and
recording the PIN value in the secure hardware element storage device operatively coupled to the server upon receipt of a confirmation message from the mobile computing device by executing the instruction set, the confirmation message confirming that the PIN value was successfully written to the mobile computing device.

27. The method of claim 26, wherein the recording step comprises updating a database record comprised in the storage device with the PIN value, the record being associated with a user of the mobile computing device.

28. The method of claim 26, wherein the recording step comprises updating a database record comprised in the storage device with the PIN, the record being associated with the mobile computing device.

29. A method of synchronising a personal identification number (PIN) at a mobile computing device with a PIN value stored in a remote server, the method comprising the steps of:
transmitting a request to record a new PIN value for the mobile computing device to the remote server, the request comprising the PIN value wherein the PIN value is recovered from the received request and stored at the remote server;
receiving an instruction set from the remote server in reply to the request, the instruction set comprising instructions for recording the PIN value on a secure hardware element comprised in the mobile computing device;
executing the instruction set on the mobile computing device in order to record the PIN value on a storage module local to the secure hardware element; and
recording the PIN value within a storage module local to the secure hardware element wherein the mobile computing device and the remote server share a first symmetrical encryption key, the first encryption key being stored on the secure hardware element;
generating a second encryption key using the first encryption key and encrypting the request with the second encryption key wherein the second encryption key is generated at the remote server using the shared first symmetrical encryption key and the generated second encryption key is used to recover the PIN value from the received request; and
generating and transmitting a confirmation message to the remote server, the message confirming if the PIN value was correctly recorded on the mobile computing device.

30. The method of claim 29, wherein the secure hardware element is provided with a first symmetrical encryption key shared with the remote server, and the method comprises:
generating a second symmetrical encryption key using the first key at the secure hardware element; and
encrypting the request at the secure hardware element with the second symmetrical encryption key prior to transmitting the request to the remote server.

31. The method of claim 30, wherein the method comprises:
generating a unique number for each request at the secure hardware element; and
the second symmetrical encryption key is generated using the first symmetrical encryption key and the unique number, such that the second symmetrical encryption key is unique for each request.

32. The method of claim 31, wherein the unique number is an application transaction counter (ATC) value.

33. The method of claim 31, wherein the unique number is an unpredictable number.

34. The method of claim 30, wherein the secure hardware element is configured to provide a secure processing environment independent to a processing environment of the mobile computing device; and
the instruction set is executed within the secure processing environment of the secure hardware element.

35. A system for synchronising a personal identification number (PIN) value stored in a mobile computing device, with a PIN value stored on a remote server of, the mobile computing device comprising:
a transmitter arranged to transmit a request to record the PIN value to the remote sever, the request comprising the PIN value wherein the PIN value is recovered from the received request and stored at the remote server;
a receiver arranged to receive an instruction set from the remote server, the instruction set comprising instructions for recording the PIN value;
a secure processor for (i) executing the received instruction set, (ii) recording the PIN value within a storage module local to the secure hardware element wherein the mobile computing device and the remote server share a first symmetrical encryption key, the first encryption key being stored on the secure hardware element and (iii) generating a second encryption key using the first encryption key and encrypting the request with the second encryption key wherein the second encryption key is generated at the remote server using the shared first symmetrical encryption key and the generated second encryption key is used to recover the PIN value from the received request; and a processor arranged to generate a confirmation message for transmittal to the remote server, the message confirming if the PIN value was correctly recorded on the mobile computing device;

and wherein the remote server comprises:
a receiver arranged to receive the request from the mobile device to record the PIN value;
PIN recovery apparatus for recovering the PIN value from the received request;
PIN storage apparatus arranged to store the PIN value in a storage device operatively connected to the server;
a processor for generating the instruction set executable by the mobile computing device, the instruction set comprising the instructions for recording the PIN value in the mobile computing device; and
a transmitter for transmitting the instruction set from the server to the mobile computing device.

* * * * *